(12) United States Patent
Gallestey et al.

(10) Patent No.: US 7,933,664 B2
(45) Date of Patent: Apr. 26, 2011

(54) METHOD OF GENERATING OPTIMAL CONTROL PROBLEMS FOR INDUSTRIAL PROCESSES

(75) Inventors: Eduardo Alvarez Gallestey, Tägerig (CH); Dario Castagnoli, Baden (CH); Alec Stothert, Westborough, MA (US)

(73) Assignee: ABB Research Ltd, Zurich (CH)

( * ) Notice: Subject to any disclaimer, the term of this patent is extended or adjusted under 35 U.S.C. 154(b) by 847 days.

(21) Appl. No.: 11/633,031

(22) Filed: Dec. 4, 2006

(65) Prior Publication Data

US 2007/0143074 A1 Jun. 21, 2007

Related U.S. Application Data

(63) Continuation of application No. PCT/CH2005/000317, filed on Jun. 6, 2005.

(30) Foreign Application Priority Data

Jun. 7, 2004 (EP) .................................... 04405350

(51) Int. Cl.
*G05B 13/02* (2006.01)
(52) U.S. Cl. .......................................... 700/29; 700/28
(58) Field of Classification Search .................... 700/28, 700/29, 53
See application file for complete search history.

(56) References Cited

FOREIGN PATENT DOCUMENTS
EP 1 418 477 A1 5/2004

OTHER PUBLICATIONS

Gallestey et al., "Using Model Predictive Control and Hybrid Systems for Optimal Scheduling of Industrial Processes", Automatisierungstechnik, vol. 51, pp. 285-293, Jun. 2003.*
Henriksson et al., "On Dynamic Real-Time Scheduling of Model Predictive Controllers", 41st IEEE Conference on Decision and Control, Las Vegas, Nevada, Dec. 2002.*
"Simulation of Electric Machinery and Power Electronics Interfacing using MATLAB/SIMULINK" Daniel Logue, Philip T. Krein, pp. 34-39, IEEE 2000.
"Control of Systems Integrating Logic, Dynamics, and Constraints" Alberto Bemporad, Manfred Morari, Automatica 35 (1999) 407-427.

* cited by examiner

*Primary Examiner* — Kidest Bahta
*Assistant Examiner* — Carlos Ortiz Rodriguez
(74) *Attorney, Agent, or Firm* — Buchanan Ingersoll & Rooney PC

(57) ABSTRACT

Modelling of industrial processes is simplified with the use of Mixed Logical Dynamic (MLD) framework. Optimal control problems can be generated for application to industrial processes. For example, two arbitrarily connected MLD blocks are automatically merged to obtain one composite MLD block. Via a repeated use of the procedure, any arbitrarily complex system containing the complete description of an industrial process can be generated from the simplest MLD building blocks. The optimal control problem is generated via adding an MLD block whose unique output becomes the cost functional of the problem. In a graphical environment, any specific industrial process may be reproduced by instantiating blocks from a library of basic MLD elements or atomic MLD blocks and by properly connecting them. In case an appropriate library is available, this process will not require any expert knowledge from the end user apart from the ability to build the graphical interconnections mentioned.

19 Claims, 2 Drawing Sheets

METHOD OF GENERATING OPTIMAL CONTROL PROBLEMS FOR INDUSTRIAL PROCESSES

CROSS REFERENCE TO RELATED APPLICATIONS

This application claims priority under 35 U.S.C. §119 to EP Application 04405350 2 filed in the EPO on 7 Jun. 2004, and as a continuation application under 35 U.S.C. §120 to PCT/CH2005/000317 filed as an International Application on 6 Jun. 2005 designating the U.S., the entire contents of which are hereby incorporated by reference in their entireties.

FIELD

Industrial process modelling, optimal control and advanced scheduling are disclosed. It departs from a method of merging two arbitrarily interconnected Mixed Logical Dynamic (MLD) subsystems into a combined MLD system and a method of designing a model based controller or scheduler for real-time control or scheduling of an industrial process.

BACKGROUND INFORMATION

Mixed logical dynamical (MLD) systems, as introduced e.g. in the article "Control of Systems Integrating Logic, Dynamics, and Constraints", A. Bemporad and M. Morari, Automatica 35(3), 1999, pp 407-427, represent a mathematical framework for modeling systems described by interacting physical laws, logical rules, and operating constraints, generally called "hybrid systems". MLD systems are determined or described by linear dynamic equations subject to linear mixed-integer inequalities involving both continuous, i.e. real-valued, and binary, i.e. boolean-valued, variables. The variables include continuous and binary states x, inputs u and outputs y, as well as continuous auxiliary variables z and binary auxiliary variables δ, as described in the following equations:

$$x(t+1)=Ax(t)+B_1 u(t)+B_2\delta(t)+B_3 z(t) \quad (Eq.\ 1a)$$

$$y(t)=Cx(t)+D_1 u(t)+D_2\delta(t)+D_3 z(t) \quad (Eq.\ 1b)$$

$$E_2\delta(t)+E_3 z(t) \le E_1 u(t)+E_4 x(t)+E_5 \quad (Eq.\ 1c)$$

In general, the variables mentioned are vectors and A, $B_i$, C, $D_i$, $E_i$ are matrices of suitable dimensions.

In order to be well posed, the MLD system (Eqs. 1) must be such that for any given x(t) and u(t) the values of δ(t) and z(t) are defined uniquely. Formulations or relationships in the form of Eqs. 1 appear naturally when logical statements are written as propositional calculus expressions, or when bounds on the states are set explicitly. Among the advantages of the MLD framework are the possibility to automatically generate the matrices of MLD systems from a high-level description. MLD systems generalize a wide set of models, among which there are linear hybrid systems and even nonlinear systems whose nonlinearities can be expressed or at least suitably approximated by piecewise linear functions.

The drawback of the MLD systems approach is the relative complexity of the theory, which in turn makes the modelling and maintenance of a complex industrial system difficult for people without a background in mixed integer optimization.

Model predictive control (MPC) is a procedure of solving an optimal-control problem, which includes system dynamics and constraints on the system output, state and input variables. The main idea of model predictive control is to use a model of the plant or process, valid at least around a certain operating point, to predict the future evolution of the system. Based on this prediction, at each time step t the controller selects a sequence of future command inputs or control signals through an on-line optimization procedure, which aims at optimizing a performance, cost or objective function, and enforces fulfillment of the constraints. Only the first sample of the optimal sequence of future command inputs is actually applied to the system at time t. At time t+1, a new sequence is evaluated to replace the previous one. This on-line re-planning provides the desired feedback control feature.

Model Predictive Control can be applied for stabilizing a MLD system to an equilibrium state or to track a desired reference trajectory via feedback control. Standard routines can then be used to recast the previous control problem into a Mixed Integer Linear Programming (MILP) of the following form:

$$\min_{\underline{v}} f(\underline{v}) = \min_{\underline{v}} \underline{g}^T \underline{v} \ s.t. \ A\underline{v} \le \underline{b}, \quad (Eq.2)$$

where the optimization vector v includes the aforementioned MLD input and auxiliary variables u, δ, z via $\underline{v}^T=[\underline{u}^T\ \underline{\delta}^T\ \underline{z}^T]$, the vector $\underline{g}$ denotes a cost vector, the matrix $\overline{A}$ is a constraint matrix and the vector $\underline{b}$ is termed a boundary vector. Standard procedures can be adapted to handle time varying parameters such as cost and price coefficients. The solution of the MILP problem can be obtained by reverting to the commercial optimisation problem solver for solving linear, mixed-integer and quadratic programming problems called CPLEX (http://www.ilog.com/products/cplex/).

Model predictive control (MPC) in combination with Mixed Logical Dynamical (MLD) systems descriptions has been used for modeling and control of processes in the utility automation and process industry. By way of example, a method of scheduling a cement production is described in the article "Using Model Predictive Control and Hybrid Systems for Optimal Scheduling of Industrial Processes", by E. Gallestey et al., AT Automatisierungstechnik, Vol. 51, no. 6, 2003, pp. 285-293.

SUMMARY

The establishment of Mixed Logical Dynamic (MLD) systems is disclosed in order to model and control complex industrial processes, based on MLD subsystems representing sub-processes of said industrial processes and in view of an automated control, scheduling or simulation of said industrial processes. Exemplary methods and a computer program for merging two arbitrarily interconnected MLD subsystems into one combined MLD system are disclosed, as well as a method of designing a model based controller or scheduler for real-time control or scheduling of an industrial process. Further exemplary embodiments are evident from the disclosure herein.

In one aspect, the original MLD subsystems are related or connected via pairs of dependent input and output variables, which pairs are transformed into additional auxiliary variables of the combined MLD system. The equations describing the original MLD subsystems and involving said dependent input and output variables in turn are converted into constraints of the combined MLD system involving the additional auxiliary variables. Hence, one aspect of the disclosure concerns the automatic merging of two arbitrarily connected MLD subsystems into one composite MLD system.

In an exemplary embodiment, a repeated use of the merging procedure allows to generate any arbitrarily complex MLD system containing the complete description of an industrial process. Provided that the industrial process can be decomposed in several sub-processes, each MLD subsystem representing a sub-process is established independently from the others in the MLD framework, and the industrial process is reproduced as a sequence of interconnected MLD blocks.

In one aspect of the exemplary embodiment, an optimal control problem is generated via adding an ultimate MLD block whose unique output becomes the objective function of the problem. In combination with Model Predictive Control (MPC) techniques, both on-line optimal control problems and scheduling applications can be generated and solved.

Such an exemplary embodiment can simplify the modelling of complex industrial processes in the Mixed Logical Dynamic (MLD) framework and allows to automatically generate and solve optimal control problems and scheduling applications for said industrial processes. For example, this can be done by graphically representing any MLD subsystem by a block whose input/output ports match the input/output variables of the MLD formulation. In a graphical environment, any specific industrial process may then be reproduced by instantiating blocks from a library of basic MLD elements or atomic MLD blocks and by properly connecting them in order to obtain a graphical representation of the process. In case an appropriate library is available, this procedure should not require undue expert knowledge from the end user, but a mere ability to build graphical interconnections.

BRIEF DESCRIPTION OF THE DRAWINGS

Additional features and advantages will be apparent to those skilled in the art upon reading the following detailed description of exemplary embodiments which are illustrated in the attached drawings, wherein.

DETAILED DESCRIPTION

Figure 1:
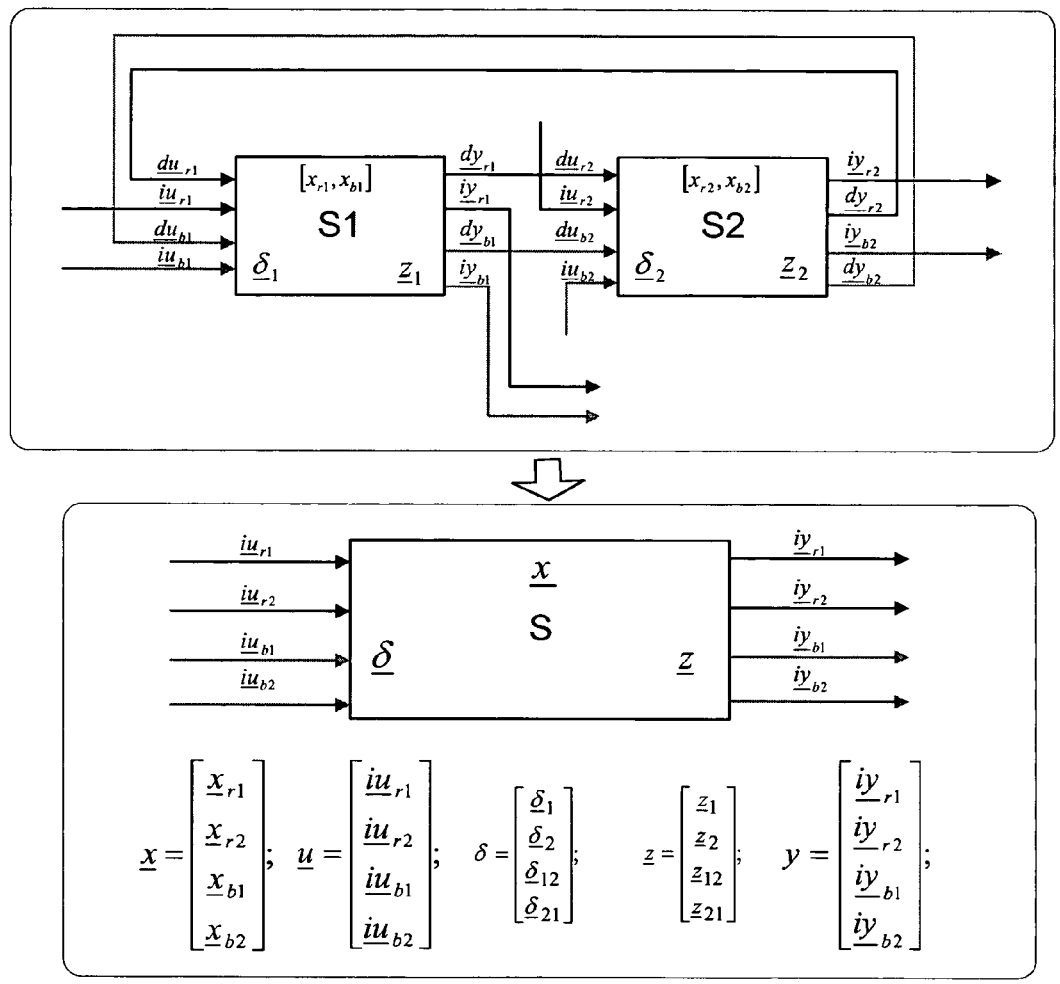
FIG. 1 shows two exemplary MLD subsystems being merged into a combined MLD system.

FIG. 1 shows two exemplary MLD blocks or subsystems S1 and S2, defined respectively by the matrices $A^1, B^1_{1...3}, C^1, D^1_{1,...,3}, E^1_{1,...,5}$ and $A^2, B^2_{1,...,3}, C^2, D^2_{1,...,3}, E^2_{1,...,5}$, as well as by the vectors of states $x_1, x_2$, the vectors of inputs $u_1, u_2$, the vectors of outputs $y_1, y_2$, the vectors of real auxiliary variables $z_1, z_2$, and the vectors of Boolean auxiliary variables $\delta_1, \delta_2$. The MLD subsystem S1, S2 are interconnected as indicated by the arrows joining the two blocks. The goal is to merge S1 and S2 in order to obtain one single or combined MLD system S described by the matrices $A, B_{1...3}, C, D_{1,...,3}, E_{1,...,5}$ and the corresponding vectors of states x, inputs u, outputs y, real auxiliary variables z and Boolean auxiliary variables $\delta$.

The matrices of the combined system S are obtained by creating matrices comprising the corresponding matrices of the subsystems S1, S2 along their diagonal as a starting point, e.g. by setting $$A = \begin{bmatrix} A^1 & 0 \\ 0 & A^2 \end{bmatrix},$$

and by subsequently eliminating or exchanging rows and/or columns as explained below. Likewise, the vectors of the combined system S are created by augmenting the vectors of S1 with the corresponding vectors of S2 as a starting point, e.g. by setting $x^T = [x_1^T \; x_2^T]$, and by subsequently eliminating or rearranging their elements if necessary. It is to be noted that the matrices and vectors of the combined system S are uniquely designated and maintain their designation throughout the subsequent operations performed on their rows, columns or elements.

The vectors of states, inputs and outputs can contain both real (denoted with the index r) and Boolean (index b) variables. If this is the case, all the real variables will have to be grouped and placed in the corresponding vector before the Boolean ones. Among the inputs and outputs certain variables are independent of the other MLD block (denoted with the prefix i) and some are dependent (prefix d). Pairs of the dependent variables are represented in FIG. 1 by a common arrow pointing from one MLD block (S1, S2) to the other MLD block (S2, S1).

The exemplary embodiment according to FIG. 1 will be detailed in the following, yet less general configurations with e.g. only one, two or three pairs of dependent variables are also conceivable and can be treated in the framework of the present invention.

The resulting state vector x of the combined MLD block S consists of a composition of all the states of S1 and S2 and is defined as $x = [x_{r1}, x_{r2}, x_{b1}, x_{b2}]$. Due to the real variables of both systems ($x_{r1}, x_{r2}$) being placed before the Boolean variables ($x_{b1}, x_{b2}$), the matrix A of the combined MLD system S, based on the matrices $A^1, A^2$ of the subsystems S1, S2 as shown above, has to have the rows and columns corresponding to $x_{b1}$ swapped with the rows and columns of $x_{r2}$. Likewise, the other matrices $B_{1...3}$ involved in the state dynamic of the system S, based on the corresponding matrices ($B^1_{1...3}, B^2_{1...3}$) of the subsystems S1, S2, undergo, in a first step, a corresponding swap of rows. Equally, in a first step a swap of columns is executed on the matrices C, $E_4$ of the system S multiplying the resulting state vector x and being based on the corresponding matrices ($C^1, E^1_4; C^2, E^2_4$) of the subsystems S1, S2.

The resulting output vector y of the combined MLD block S consists of a composition of the independent outputs of S1 and S2 and, taking into account the "real" before "Boolean" principle, is defined by $y = [iy_{r1}, iy_{r2}, iy_{b1}, iy_{b2}]$. Again, the matrices involved in the output dynamic (C, $D_{1,...,3}$) of the system S are based on the corresponding matrices ($C^1, D^1_{1,...,3}; C^2, D^2_{1,...,3}$) of the subsystems S1, S2. Along the same idea, the rows of these matrices corresponding to $iy_{b1}$ will have to be swapped in a first step with the rows corresponding to $iy_{r2}$. Additionally, as the dependent outputs are lost, the corresponding rows of the C, $D_{1,...,3}$ matrices have to be deleted.

The resulting input vector u of the combined MLD block S consists of a composition of the independent inputs of S1 and S2 and is defined as $u = [iu_{r1}, iu_{r2}, iu_{b1}, iu_{b2}]$. Again, the real variables of both systems are being placed before the Boolean variables. The dependent inputs have been dropped. This implies that the input matrix $B_1$, in a second step, will undergo a swap between the columns corresponding to $iu_{b1}$ and $iu_{r2}$ and, in a third step, will have to have the columns corresponding to the dependent inputs ($du_{r1}$, $du_{b1}$ and $du_{r2}$, $du_{b2}$) deleted. Likewise, the other input matrices $D_1$, $E_1$ of the system S, being based on the matrices ($D^1_1$, $E^1_1$; $D^2_1$, $E^2_1$) of the subsystems S1, S2, will undergo a swap of columns between $iu_{b1}$ and $iu_{r2}$ and, in a second step, will have the columns corresponding to the dependent inputs ($du_{r1}$, $du_{b1}$; $du_{r2}$, $du_{b2}$) deleted.

The eliminated real dependent inputs $du_{r1}$, $du_{r2}$ will then be substituted by additional real auxiliary variables $z_{12}$, $z_{21}$ added to the real auxiliary variables z of the combined system S. Thus the real auxiliary variables of the MLD system S, z=[$z_1$, $z_2$, $z_{12}$, $z_{21}$], include the original auxiliary variables ($z_1$, $z_{12}$) of S1 and S2 plus the ones introduced by the S1-S2 and S2-S1 real interconnections. Similarly, the Boolean dependent inputs $du_{b1}$, $du_{b2}$ will be replaced by additional Boolean auxiliary variables $\delta_{12}$, $\delta_{21}$ added to the Boolean auxiliary variables $\delta$ of the combined system S. This transformation is obtained or executed by appending the columns deleted from the matrices $B_1$, $D_1$ and $E_1$ (observing a change of sign for the latter) to the matrices $B_3$, $D_3$, and $E_3$ if real or to the matrices $B_2$, $D_2$, and $E_2$ if Boolean.

The equations $dy_1 = du_2$ and $dy_2 = du_1$ between the dependent inputs and outputs of the two subsystems S2 and S1 represent the connections between the subsystems. The information contained therein has to be retained and included in the formulation of the combined MLD system S. However, as the dependent variables (dy, du) do not appear in the final formulation, this is not a straightforward task. In the case of the S1-S2 connection (short straight arrows in FIG. 1), the original expression for the dependent outputs $dy_1$ of subsystem S1 is comprised in the set of equations $$y_1 = C^1 x_1 + D^1_1 u_1 + D^1_2 \delta_1 + D^1_3 z_1. \qquad \text{(Eq. 1b)}$$

As a result of the row-elimination procedure above, these expressions for $dy_1$ are absent from the resulting equations for the output variable y of the combined MLD block S.

Eq. 1b comprises terms of the type $D^1_1 du_1$ wherein the dependent inputs $du_1$ have to be replaced by the additional auxiliary real and/or Boolean variables ($z_{12}$, $\delta_{12}$) introduced above. Likewise, the dependent inputs $du_2$ have to be replaced by the additional auxiliary variables ($z_{21}$, $\delta_{21}$) introduced above. Thus, the equations $du_2 = dy_1$ translate into $$[z^i_{21}/\delta^i_{21}] = dy_{r1}/dy_{b1} = \tilde{C}^1_i x_1 + \tilde{D}^1_i iu_1 + \tilde{D}^1_{i2}[\delta_1^T \delta_{12}^T]^T + \tilde{D}^1_{i3}[z_1^T z_{12}^T]^T \qquad \text{(Eq. 1d)}$$

where the tilde and the subscript matrix index i($\tilde{C}^1_i$, $\tilde{D}^1_{i\,1\ldots3}$) signify that only the i-th rows and the relevant columns of the matrices $C^1$ and $D^1_{1\ldots3}$ are exploited. This equality constraints involving only state variables ($x_1$), independent input variables ($iu_1$) and auxiliary variables [$z_1$ $z_{21}$ $z_{12}$; $\delta_1$ $\delta_{12}$ $\delta_{21}$] obtained with the previous manipulations or substitutions can therefore be added as additional rows to the matrices $E_i$ of the combined MLD system S. Additional constraints in terms of MLD inequalities are formed by turning every single equality or line in the above vector equation Eq. 1d into two inequalities or rows by noting the former both in form of $\le$ and in the form of $\ge$. The case of the S2-S1 connection (long returning arrows in FIG. 1) is similar and results in exchanged indices.

The combined or merged MLD system S resulting from the procedure outlined above in turn can be considered as a subsystem itself. Via iterated application of the procedure, a complex MLD system $S_{tot}$ representing all relevant technical aspects of an arbitrarily complex industrial installation or process can be generated. Thereby order of merging of the "basic" MLD subsystems or "atomic" MLD blocks does not have any impact on the final result and may be chosen at will.

In order to use the MLD system for a model based control procedure an objective function or cost functional $f$ has to be defined. In the context of the present invention, this is most conveniently done via adding a functional MLD subsystem $S_{cost}$ comprising exactly one independent scalar output variable $y_{cost}$ representing the objective to be optimized. This functional MLD subsystem $S_{cost}$ is ultimately merged to the complex MLD system $S_{tot}$ representing all relevant technical aspects of the physical process. Thereby, all the outputs of the complex MLD system $S_{tot}$ that are related to costs are regarded as dependent outputs with corresponding dependent inputs of the functional MLD subsystem $S_{cost}$. Obviously, there is no restriction on the number of independent inputs u serving as control variables or command inputs of the single-output MLD system S that results from the aforementioned ultimate merger.

The exemplary method is illustrative and not restrictive. Such exemplary methods can be applied to many industrial processes with a limited effort. In the following, a particular implementation of the exemplary method in a cement plant is presented in more detail with reference to FIG. 2.

Figure 2:
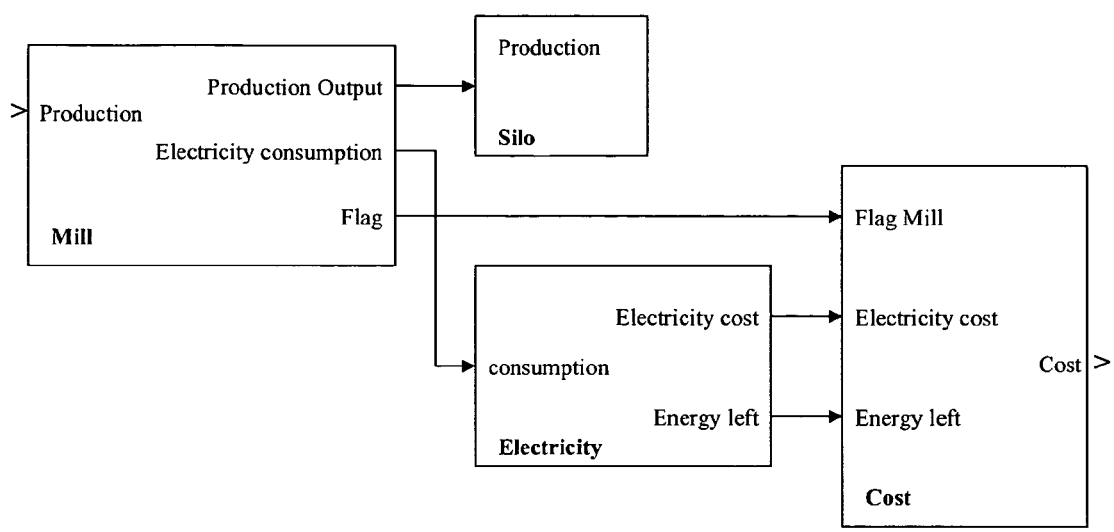
FIG. 2 depicts exemplary MLD subsystems representing the sub-processes of the grinding section of a cement plant.

Cement mill scheduling implies deciding when to produce a certain cement grade on which mills. Due to the number of mills, grades, silos, conveyor belts and the various operating constraints the problem is quite complex. In a hybrid system framework, the mills are treated as finite state or on/off machines that associate different energy consumptions and throughputs depending on the cement grade produced. Generally, a library of basic MLD blocks or subsystems is provided for each basic element or sub-process of the complex industrial process being modeled. In a cement mills scheduling example, these blocks typically consist of the MLD formulation for a "mill", "silo" and "electricity". In particular, the representation of the grinding section of a cement plant according to FIG. 2 comprises one MLD block associated to the Cement Mill (one input, three outputs), one MLD block associated to the Cement Silo (one input) and one associated to the Electricity section (one input, two outputs). The optimal control problem is generated via adding a functional or cost MLD block, of which the unique output variable $y_{cost}$ becomes the objective function of the problem. The next step is to iteratively merge two interconnected MLD blocks to obtain a combined block, until only one block is left. The final MLD block, resulting from the merging process, will have as inputs all the independent inputs of the various MLD subsystems, i.e. the input "production" in the exemplary embodiment of FIG. 2, and as output the unique output of the cost block, representing the objective function of the optimal control problem. The arrows in FIG. 2 represent interconnections between the individual blocks or subsystems just as in FIG. 1.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of configuring a controller for real time control of an industrial process involving at least one industrial machine, wherein
    a combined Mixed Logical Dynamic (MLD) system represents an industrial process involving at least one industrial machine, each of at least two MLD subsystems represents a sub-process of the industrial process, the MLD subsystems and the combined MLD system each involve vectors of states, vectors of inputs, vectors of outputs, real auxiliary variables and Boolean auxiliary variables, and are described by a state equation, an output equation and constraints, the at least two subsystems are interconnected via dependent pairs formed by a dependent output of one subsystem and a dependent input of the other subsystem, and independent inputs and outputs of the subsystems are not part of the dependent pairs, the state vector of the combined system is composed of the corresponding vectors of states of the subsystems, the input and output vectors of the combined system are composed of the corresponding independent inputs and outputs of the subsystems, and the auxiliary variables of the combined system comprise the corresponding auxiliary variables of the subsystems, wherein the method comprises merging the MLD subsystems into the MLD system by:

replacing each dependent pair by an additional auxiliary real and/or Boolean variable of the combined system, and converting the output equation for the dependent output of each of the subsystems into additional constraints of the combined system using the additional auxiliary real and/or Boolean variables exclusive of the replaced dependent pair.

2. The method according to claim 1, wherein the method is based on matrices which are combined into corresponding matrices for the combined system, and wherein the rows and columns of the matrices for the combined system corresponding to dependent inputs and outputs are eliminated and replaced by additional rows and columns corresponding to the additional auxiliary real and/or Boolean variables .

3. The method according to claim 2, wherein the combined MLD system is regarded as an MLD subsystem and in turn is merged with a further subsystem.

4. A computer readable medium storing a computer program for combining two arbitrarily interconnected Mixed Logical Dynamic (MLD) subsystems into one MLD system, which computer program is loadable and executable on a data processing unit and performs, when being executed, the steps according to claim 2.

5. The method according to claim 1, wherein the combined MLD system is regarded as an MLD subsystem and in turn is merged with a further subsystem.

6. The method according to claim 5, wherein a complex MLD system to be optimized is generated by iteratively combining MLD subsystems.

7. The method according to claim 6, wherein one of the MLD subsystems is a functional MLD subsystem comprising a unique scalar independent output variable representing an objective of the complex MLD system to be optimized.

8. A method of designing a model based controller or scheduler for real-time control or scheduling of an industrial process, wherein the controller is based on a complex Mixed Logical Dynamic (MLD) system model of the industrial process, and wherein the complex MLD system is obtained by iteratively combining MLD subsystems according to a method of merging two arbitrarily interconnected MLD subsystems into a combined MLD system as claimed in claim 6.

9. The method according to claim 8, wherein a functional MLD subsystem comprising a unique scalar independent output variable representing an objective of the complex MLD system to be optimized is combined with the complex MLD system to be optimized, and said unique scalar independent output variable is used in a Model Predictive Control (MPC) formulation with independent inputs of the MLD subsystems as command or control variables.

10. A computer readable medium storing a computer program for combining two arbitrarily interconnected Mixed Logical Dynamic (MLD) subsystems into one MLD system, which computer program is loadable and executable on a data processing unit and performs, when being executed, the steps according to claim 5.

11. A computer readable medium storing a computer program for combining two arbitrarily interconnected Mixed Logical Dynamic (MLD) subsystems into one MLD system, which computer program is loadable and executable on a data processing unit and performs, when being executed, the steps according to claim 1.

12. The method according to claim 1, wherein the controller is a scheduler for real-time scheduling of an industrial process.

13. A method of configuring a controller for real time control of an industrial process involving at least one industrial machine, comprising:

representing a combined Mixed Logical Dynamic (MLD) system as an industrial process involving at least one industrial machine;

representing MLD subsystems as a sub-process of the industrial process;

describing the MLD subsystems and the combined MLD system as equations based on vectors of states, vectors of inputs, vectors of outputs, real auxiliary variables and Boolean auxiliary variables; and interconnecting two MLD subsystems via dependent pairs formed by a dependent output of one of the two MLD subsystems and a dependent input of the other of the two MLD subsystems, wherein independent inputs and outputs of the MLD subsystems are not part of the dependent pairs, and wherein state vector of the combined system is based on corresponding states of the MLD subsystems, and input and output vectors of the combined system are based on the corresponding independent inputs and outputs of the MLD subsystems;

wherein each dependent pair is replaced by an additional auxiliary real and/or Boolean variable of the combined system; and wherein the output vectors of the combined system uses the additional auxiliary real and/or Boolean variables exclusive of the replaced dependent pair.

14. The method according to claim 13, wherein:

auxiliary variables of the combined system comprise corresponding auxiliary variables of the MLD subsystems.

15. The method according to claim 13, wherein:

output equations for the dependent output of each of the MLD subsystems are converted into additional constraints of the combined system involving the additional auxiliary real and/or Boolean variables.

16. The method according to claim 13, wherein the controller is a scheduler for real-time scheduling of an industrial process.

17. A model based controller for real-time control of an industrial process, wherein the controller comprises a combined Mixed logical Dynamic (MLD) system representing the industrial process which is obtained by merging two arbitrarily interconnected MLD subsystems, wherein:
- each of the MLD subsystems represents a sub-process of an industrial process;
- the MLD subsystems and the combined MLD system each involve vectors of states, vectors of inputs, vectors of outputs, real auxiliary variables, and Boolean auxiliary variables, and are described by a state equation, an output equation and constraints;
- the MLD subsystems are interconnected via a dependent pair formed by a dependent output of one of the two MLD subsystems and a dependent input of the other one of the two MLD subsystems;
- independent inputs and outputs of the MLD subsystems are independent of the dependent pair;
- the state vector of the combined system is composed of the corresponding state vectors of the MLD subsystems;
- the input and output vectors of the combined system are composed of the corresponding independent inputs and outputs of the MLD subsystems;
- the auxiliary variables of the combined system comprise corresponding auxiliary variables of the MLD subsystems;
- the dependent pair is replaced by at least one of an additional auxiliary real and an additional auxiliary Boolean variable of the combined system; and
- the output equations for the dependent outputs of the MLD subsystems are converted into an additional constraint of the combined system using the at least one of the additional auxiliary real and the additional auxiliary Boolean variable exclusive of the replaced dependent pair.

18. The model based controller according to claim 17, wherein one of the MLD subsystems is a function MLD system comprising:
- a unique scalar independent output variable representing an objective of the MLD system, the unique scalar independent output variable being used in a Model Predictive Control (MPC) formulation with the independent inputs of the MLD subsystems.

19. The model based controller according to claim 17, wherein the controller is a scheduler for real-time scheduling of an industrial process.

* * * * *